(12) United States Patent
Woods

(10) Patent No.: US 12,733,629 B2
(45) Date of Patent: Sep. 15, 2026

(54) BIRD FEEDER

(71) Applicant: Richard Edwin Woods, Wingham (GB)

(72) Inventor: Richard Edwin Woods, Wingham (GB)

( * ) Notice: Subject to any disclaimer, the term of this patent is extended or adjusted under 35 U.S.C. 154(b) by 575 days.

(21) Appl. No.: 17/600,785

(22) PCT Filed: Aug. 26, 2020

(86) PCT No.: PCT/GB2020/052044

§ 371 (c)(1),
(2) Date: Oct. 1, 2021

(87) PCT Pub. No.: WO2021/084222

PCT Pub. Date: May 6, 2021

(65) Prior Publication Data

US 2022/0256816 A1 Aug. 18, 2022

(30) Foreign Application Priority Data

Oct. 30, 2019 (GB) ..................................... 1915749

(51) Int. Cl.
*A01K 39/012* (2006.01)

(52) U.S. Cl.
CPC ................................ *A01K 39/0125* (2013.01)

(58) Field of Classification Search
USPC ... 119/52.2, 57.8, 52.1, 52.3, 52.4, 53, 53.5, 119/54, 55, 57; 222/481, 153.11–153.14,
(Continued)

(56) References Cited

U.S. PATENT DOCUMENTS 1,226,722 A * 5/1917 Sullivan ................. B65D 83/06 222/548
1,997,837 A 4/1935 Taurman
(Continued)

FOREIGN PATENT DOCUMENTS

GB 2443733 * 5/2005 ........... A01K 39/012

OTHER PUBLICATIONS

UK Intellectual Property Office, Search Report Under Section 17, Application No. GB1915749.4, Apr. 24, 2020.
(Continued)

*Primary Examiner* — Andrea M Valenti
(74) *Attorney, Agent, or Firm* — Invention To Patent Services; Alex Hobson

(57) ABSTRACT

A bird feeder has a main body including a food hopper, and a removable tray. The tray may be removed from the main body, and when the tray is removed apertures at the bottom of the main body are automatically closed, sealing the main body and preventing food from falling out. When the tray is attached, the apertures are automatically opened. The tray of the bird feeder can therefore be removed very easily for cleaning. Another tray may be provided for installation on the main body while the first tray is being cleaned. Cleaning may be for example by soaking in disinfectant for a few days, or drying out over a similar period. These treatments are effective to kill *Trichomonas gallinae*, thus limiting the spread of trichomonosis among garden birds, especially greenfinches.

16 Claims, 10 Drawing Sheets

(58) Field of Classification Search
USPC .............. 222/153.1, 153.01, 153.03, 153.04, 222/153.09; 141/292, 291
See application file for complete search history.

(56) References Cited

U.S. PATENT DOCUMENTS

| | | | | |
|---|---|---|---|---|
| 3,648,661 | A | 3/1972 | Moore | |
| 3,738,326 | A * | 6/1973 | Atchley | A01K 1/0088 119/515 |
| 4,040,389 | A * | 8/1977 | Walters | A01K 5/0225 119/52.1 |
| 5,033,411 | A | 7/1991 | Brucker | |
| 5,558,040 | A * | 9/1996 | Colwell | A01K 39/012 119/52.2 |
| 5,641,012 | A * | 6/1997 | Silversides | A01C 15/006 141/346 |
| 5,690,056 | A * | 11/1997 | Korb | A01K 39/0113 119/52.3 |
| 5,947,171 | A * | 9/1999 | Woodruff | B65D 23/102 141/354 |
| 5,967,383 | A * | 10/1999 | Hidalgo | A01C 15/00 222/548 |
| 7,721,210 | B2 | 5/2010 | Mansikkaniemi et al. | |
| 8,459,206 | B1 * | 6/2013 | Colvin | A01K 39/01 119/57.8 |
| D720,506 | S * | 12/2014 | Bruno | D30/127 |
| 10,076,774 | B1 * | 9/2018 | Evanko | C11D 7/12 |
| 10,342,220 | B2 * | 7/2019 | Haney | A01K 39/04 |
| 2005/0000459 | A1 * | 1/2005 | Buhl | A01K 39/012 119/52.2 |
| 2005/0045110 | A1 * | 3/2005 | Franck, Jr. | A01K 39/012 119/57.8 |
| 2008/0314327 | A1 | 12/2008 | Hepp et al. | |
| 2009/0159008 | A1 * | 6/2009 | Humphries | A01K 39/04 119/51.01 |
| 2010/0089330 | A1 * | 4/2010 | McMullen | A01K 39/0206 119/52.2 |
| 2010/0251967 | A1 | 10/2010 | Mateer et al. | |
| 2012/0060762 | A1 | 3/2012 | Cowger et al. | |
| 2018/0142792 | A1 * | 5/2018 | Feiler | F16K 11/074 |

OTHER PUBLICATIONS

European Patent Office, PCT International Search Report, PCT/GB2020/052044, Sep. 11, 2020.

* cited by examiner

22′
54′
12′
40′
10′
46′
58′

56′
12′
10′
46′

58′
40′

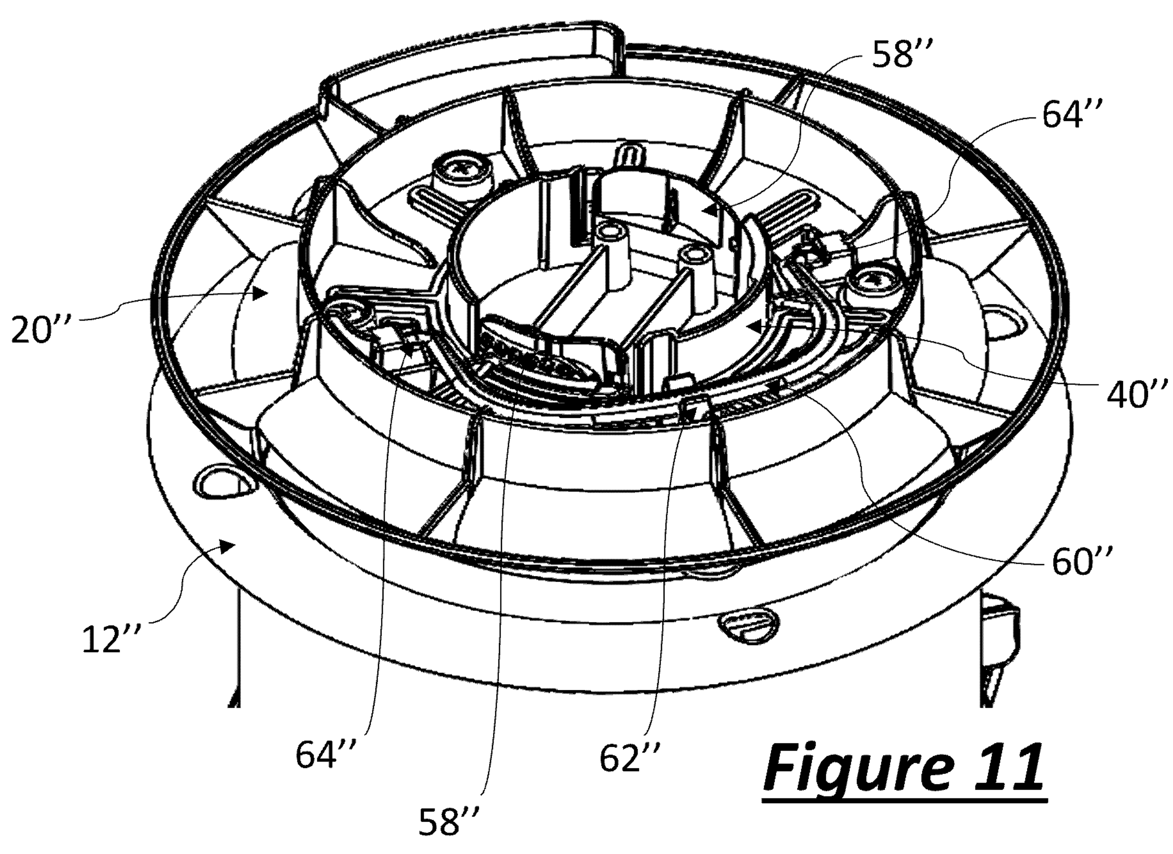
Figure 11
Figure 12
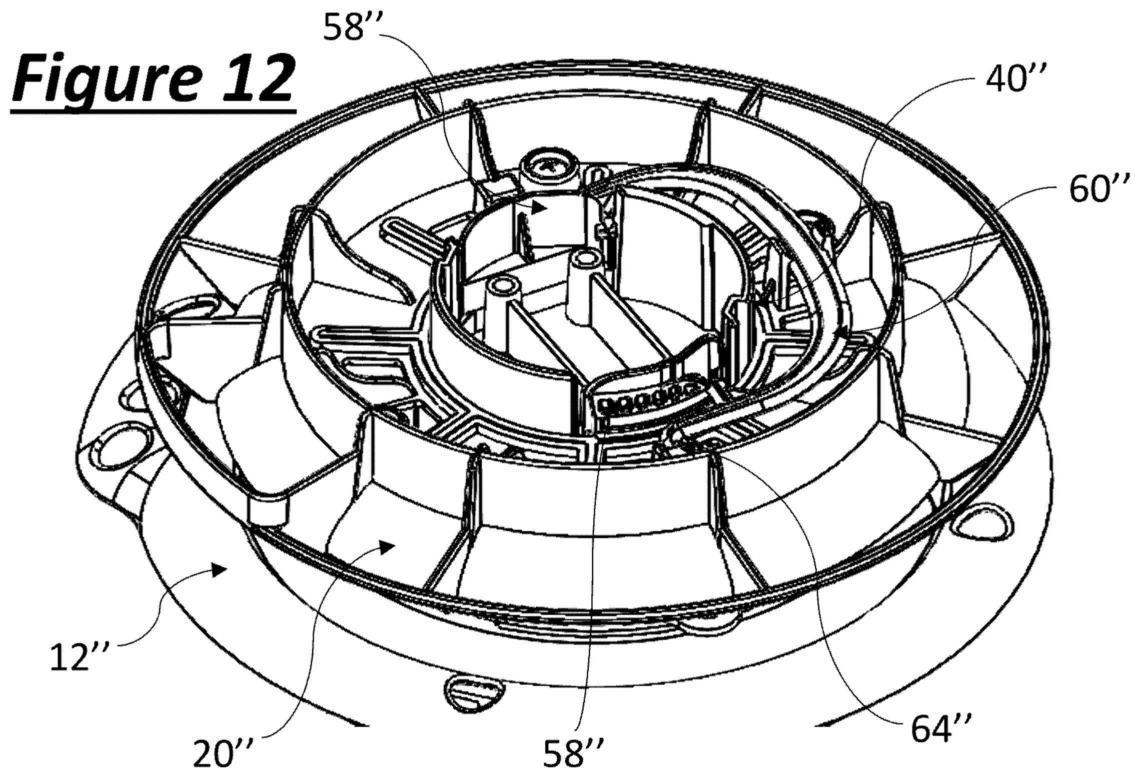

BIRD FEEDER

CROSS REFERENCE TO RELATED APPLICATIONS

The present application claims the benefit to International Application No. PCT/GB2020/052044 filed on Aug. 26, 2020 and U.K Patent Application No. GB1915749.4 filed on Oct. 30, 2019, which are incorporated herein by reference in their entireties.

FIELD

The present invention relates to a bird feeder, particularly to a bird feeder with a removable feeding tray.

BACKGROUND

Many people choose to put out food for wild birds. Bird feeders attract birds to gardens and many people enjoy watching the birds feed. Feeding can also be beneficial for the bird population, increasing survival rates all year round, but especially during times of shortage in the Winter and during the Spring breeding season.

Unfortunately in recent years certain wild bird populations have suffered from trichomonosis, a disease caused by the protozoan parasite *Trichomonas gallinae*. Trichomonosis has affected especially the UK greenfinch population, with epidemics in 2006 and 2007 and smaller scale mortality events in subsequent years. *Trichomonas* causes disease in the back of the throat, and affected birds may have difficulty swallowing. When trying to feed, diseased birds may regurgitate food. The disease can spread when food regurgitated by an infected bird is subsequently eaten by a healthy bird.

Garden bird feeders can be a contributing factor in the spread of trichomonosis among birds, especially greenfinches, because many birds will typically visit the feeder. A typical design of a birdfeeder suitable for finches has a large hopper of food (for example, seeds), and a tray into which a small amount of food falls at a time. As food is eaten from the tray, more food automatically falls from the hopper to replace it. The feeders are designed so that the hopper is continuously but slowly emptied by gravity, as the food is eaten. Contaminated food regurgitated by a diseased bird is likely to be deposited on the tray and may then be eaten by another bird which subsequently becomes infected.

*Trichomonas* can be killed relatively easily. It cannot survive for long outside the host, and will die if dried out. It is also easily killed by a weak solution of household bleach (5% sodium hypochlorite). An effective way to limit the spread of trichomonosis and ensure that garden bird feeders indeed have a beneficial effect is simply to ensure that bird feeders are regularly cleaned. However, this is not always easy to do. In particular, in feeders of the type with a large hopper feeding into a tray, the amount of food stored in the hopper may last many months, and it is impossible to effectively clean the feeder without wasting a significant amount of food. Many people will be reluctant to clean the feeder regularly, both because it can be a fiddly job as some feeders have complex shapes with hard-to-reach surfaces, and because they do not want to waste food they have bought.

Other diseases which spread in wild bird populations by transmission at bird feeders include *salmonella*, a bacterial infection which spreads when healthy birds eat food contaminated by the droppings of infected birds, and aspergillosis, caused by the *Aspergillus* fungus which is found in damp or wet seed mixtures.

It is an object of the present invention to provide an improved bird feeder which is easier to clean and may be used to limit spread of disease, in particular trichomonosis.

SUMMARY

According to a first aspect of the present invention, there is provided a bird feeder, the bird feeder comprising: a main body including a bulk hopper for storing food, and a feeding tray removably attached to a bottom end of the main body, in which an opening is provided in the bottom end of the main body to allow stored food to pass from the bulk hopper into the tray when the tray is attached, and in which a closure is provided for closing the opening and retaining food in the bulk hopper, and in which a locking mechanism is provided for locking the feeding tray and main body together, preventing removal of the feeding tray from the main body when the locking mechanism is engaged, and in which opening the closure causes engagement of the locking mechanism, and closing the closure causes disengagement of the locking mechanism, the feeding tray being detachable from the main body only when the closure is closed.

Advantageously, the bird feeder is provided in two parts, with a tray which can be removed for cleaning. At any time, only a relatively small amount of food will be on the tray, with the rest stored in the bulk hopper. The food stored in the bulk hopper is not exposed to the birds and is protected from contamination. The tray can be removed and cleaned regularly to limit the spread of disease. When the tray is removed, no food from the bulk hopper is wasted.

Preferably, a releasable secondary retaining means is provided for retaining the feeding tray to the main body when the locking mechanism is disengaged. In this way the closure may be closed and the locking mechanism disengaged, so that food stops flowing from the hopper into the tray, but the tray can be left in place for a time, for example a few hours to a day. The birds can then eat the remaining food on the tray before the tray is removed for cleaning, by disengaging the secondary retaining mechanism. In this way, no food has to be wasted.

It is envisaged that embodiments of the bird feeder are sized to be particularly suitable for feeding finches. Embodiments of the feeder are designed to be used with dry solid foods, for example seed mixes and/or pelletised bird food.

Preferably, two removable trays could be provided for one main body. One tray can be cleaned while the other is installed on the main body of the feeder. This helps to make cleaning easy, because it can be done over a period of time. For example, an effective way of cleaning a tray could be to empty out any small amount of leftover food into the bin, and then to place the tray in a bucket of disinfectant, for example a weak solution of bleach. If left in disinfectant for several days, it is likely that any parasites will be killed without the need for mechanical cleaning action.

Alternatively, it may be possible to leave the tray in a suitable environment in which it will completely dry out. Again, effective desiccation is likely to kill any *Trichomonas* present. Desiccation may be carried out simply by placing the tray in a dehumidified chamber for a few days. Treating a tray in this way, although it takes time, does not require any manual work apart from putting the tray into the chamber and taking it out again a few days later. This method of treating the tray to kill *Trichomonas* also has the advantage that it could potentially be done without wasting any food at all.

As a further alternative, the tray when removed could be cleaned alongside dirty dishes, for example in a dishwasher. It is noted that *Trichomonas* poses no risk to human health.

Ideally the tray is cleaned around once a week. Cleaning of this frequency is thought to be effective to significantly reduce transmission of *Trichomonas* in bird populations using the feeder.

The locking mechanism may be for example a pin in the tray corresponding with an upside-down-L-shaped slot in a substantially cylindrical shell of the main body, so that the tray may be rotated with respect to the main body to lock the tray to the main body, and in which the two parts may be relatively rotated in the other direction to release the locking mechanism and allow detachment.

Alternatively the pin may be attached to the main body and the slot provided in a part of the tray.

The envisaged locking mechanism is similar to a bayonet-type fitting, although a bayonet-type fitting would typically include a spring and a short vertical slot extending at right-angles from the short arm of the “L” to retain the pin in the locked position until it is pushed out of place against the spring, and then rotated. It is found that in embodiments, requiring a push against a spring can be difficult to implement because the bird food present in passages between the hopper and the tray will not compact. At the same time, the same food presents resistance against rotation which makes accidental rotation of the tray relative to the body unlikely, and so a spring and retaining slot is unnecessary.

The closure is automatically opened when the tray is locked to the main body, and automatically closed when the tray is unlocked from the main body. In one embodiment, the closure is in the form of a rotatable plate which is rotatably fixed at the bottom of the bulk hopper. The rotatable plate includes at least one aperture for allowing food to pass out of the hopper and into the tray, when attached. A further fixed plate includes a similar aperture. By rotating the plate, the apertures can be made to line up, allowing food to pass out of the hopper, or alternatively the apertures can be disposed out of line, blocking food from passing out of the hopper.

Pins or other actuating means may be provided to link the rotating plate to the tray, so that when the tray is rotated to lock it to the main body of the feeder by the L-shaped slot fitting, the closure at the same time is opened, and when the tray is rotated the other way to unlock it from the L-shaped slot fitting, the closure is automatically closed.

The same arrangement may be used with other locking means which are locked and unlocked by rotation, apart from fittings using an L-shaped slot.

Therefore the tray is locked to the body, and the closure is opened, in a single motion (in one example, a rotation motion). Likewise the tray is unlocked from the body, and the closure is closed, in a single motion (in one example, a rotation motion in the opposite direction). Therefore the bird feeder can never be in a condition where it is possible to remove the tray with the closure open.

The secondary retaining means may be provided for example as one or more retractable lug(s) in a part of the main body which extends through the tray, when the tray is installed on the main body. When the tray is installed on the main body, the lug(s) may be disposed beneath the tray, and extend outwardly of part of the main body to prevent the tray from moving downward and detaching from the main body. The lug(s) may be spring-loaded into the outwardly extending position, and manually pushable to retract the lug(s) so that the tray can be moved past the lug(s) and detached from the main body.

In use, it is envisaged that the tray would be attached to the main body, and locked to the main body, opening the passage to allow food to flow from the main body into the tray so that birds can feed.

After a time period, for example a few days or a week, the closure would be closed, preventing more food from passing out of the main hopper into the tray. For example, in an envisaged embodiment this is done by rotating the tray with respect to the main body. At this stage, the tray becomes unlocked from the main body, but is still retained by the secondary retaining means. The feeder can be left in this position for a few hours, or overnight, until the birds have eaten what food is left on the tray. The secondary retaining means are then disengaged (for example, in one embodiment, by pushing on the lug(s) to retract them) and the tray is removed for cleaning.

The tray can then be cleaned and replaced, or alternatively the tray could be swapped for a new tray which has already been cleaned. This allows the tray to be cleaned or disinfected over a longer period of time but in a way which involves little manual effort, for example by soaking, dessication, or in a dishwasher.

It will be appreciated that a similar mechanism could be made to work to both lock the tray to the main body and open the opening between the main body and the tray, using a linear sliding motion as opposed to a rotating motion. Other automatic means may also be contrived to automatically open/close the opening when the tray is locked/unlocked, including means using electrical or magnetic components as well as purely mechanical.

Preferably, the main body forms a roof over the tray, to prevent rainfall into the tray. This limits the extent to which food in the tray can become wet, further limiting the spread of *Trichomonas* which cannot survive desiccation. The tray is preferably narrow, limiting its volume. This helps to reduce the amount of food in the tray at any one time. Hence when the closure is closed it is to be expected that food remaining in the tray would be eaten by birds within a few hours, or a day at most. Therefore very little or no food will be wasted when the tray is cleaned. The tray may have a retaining lip to control the flow of food from the hopper by providing friction, and to prevent food from falling on the floor. Preferably, a separate perch is provided to allow birds to stand on the perch and feed. The perch may be integrated into the tray but is separate in the sense that a gap is provided between the perch and the part of the tray which holds the food. A vertical wall may be provided to keep the extent of the food tray narrow and prevent or at least discourage birds from standing in the tray. This combination of features reduces birds faeces in the tray, further improving hygiene and limiting the spread of disease.

The bulk hopper is preferably closed and substantially watertight. In some embodiments, the bulk hopper may store many months’ worth of food. The bulk hopper keeps food clean and dry, and only needs to be topped up when empty. Meanwhile the trays can be removed for regular cleaning, wasting at most a small amount of food and ensuring effective disease control with minimal effort.

Preferably a bracket, hook, or fixing may be provided for hanging the bird feeder or otherwise fixing it to a structure. Hanging the bird feeder by a rope, for example from a tree, may help to ensure that only birds, and not for example squirrels, can access the feeder. For this purpose a hook or eye may be provided in the top of the main body.

According to a second aspect of the invention, there is provided a method of limiting the spread of disease in a population of birds, the method comprising providing a bird feeder as per the first aspect of the invention, and providing an additional feeding tray, and of installing one of the feeding trays onto the main body of the bird feeder for allowing birds to feed, and of treating the other of the feeding trays to kill an agent of infection, and of alternating the feeding trays on a regular basis.

In one embodiment of the method, alternating the feeding trays includes the steps of: closing the closure to prevent food from passing from the bulk hopper to the tray; leaving the tray attached to the main body for a period of time; removing the tray from the main body, attaching a replacement tray, and opening the closure to allow food to pass from the bulk hopper to the replacement tray.

The period of time for which the tray is left attached to the main body after the closure is closed and before the tray is removed, may be an hour or more, preferably three hours or may, preferably up to around 24 hours.

In one embodiment, the feeding tray being treated may be soaked in a disinfectant solution, for example a weak bleach.

In another embodiment, the feeding tray being treated may be dried out.

The treatment is preferably carried out over a period of a few days. Treatments such as soaking or drying out over a few days require little manual effort.

The bird feeder used in the second aspect of the invention may be according to any of claims 2 to 15.

BRIEF DESCRIPTION OF THE DRAWINGS

For a better understanding of the present invention, and to show more clearly how it may be carried into effect, reference will now be made by way of example only to the accompanying drawings, in which:

FIG. 11 is a perspective view of a tray of a bird feeder according to another embodiment of the present disclosure;

FIG. 12 is a perspective view of the tray of FIG. 11, wherein the tray is in an unlocked position.

DETAILED DESCRIPTION

Figure 1:
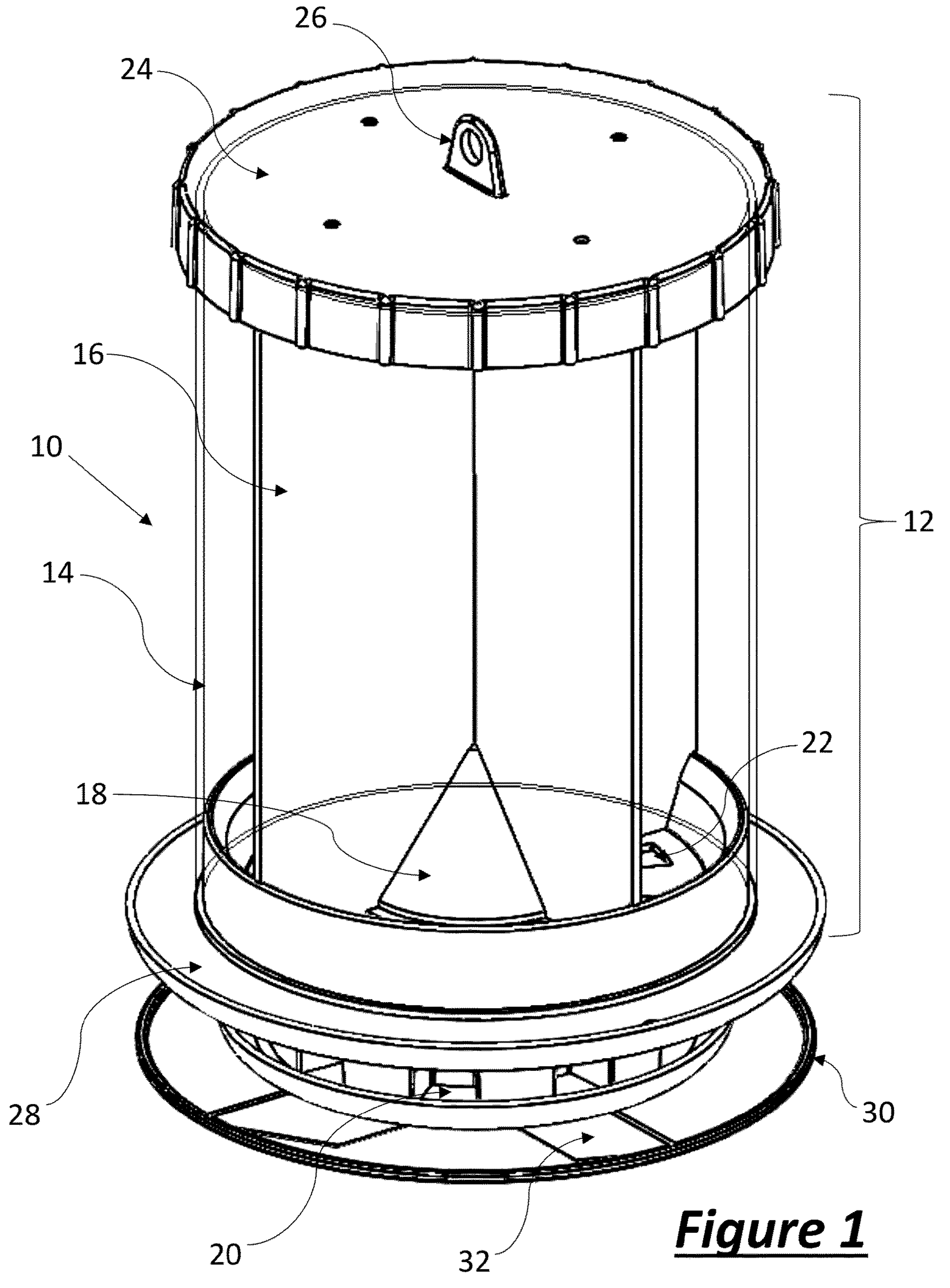
FIG. 1 is a perspective view of a bird feeder according to the invention, comprising a main body and a tray.

Referring firstly to FIG. 1, a bird feeder is generally indicated at 10. The bird feeder includes a main body 12, which includes a hopper 14 for storing bird food. The bulk hopper 14 is divided lengthways into four quarters by a divider 16. Different kinds of food could be put into each of the four quarters, for example to cater for a number of different species of garden bird.

A conical flow guide 18 is disposed at a lower end of the hopper 14. The conical flow guide diverts food towards the periphery of the hopper 14 as the food falls by gravity to be dispensed out of the bottom, into the tray 20. Around the periphery of the floor of the hopper are a series of apertures 22 (only one if which is clearly visible in FIG. 1). As food is eaten out of the tray 20 by birds, food from the hopper falls by gravity through the apertures 22 to replace the food taken from the tray 20.

A screw-on lid 24 protects the food in the hopper 14 from rain and contamination. Apart from the apertures 22, the hopper 14 is preferably substantially sealed. An eye 26 allows the bird feeder to be hung, for example from a tree or pole.

As an alternative to hanging by the eye 26, holes may be drilled in the screw-on lid 24, so that the lid may be screwed underneath a flat surface, for example a shelf. Four indentations are provided in the lid 24 to provide a guide for this purpose. In this case, the eye 26 may be cut off, for example with a simple tool such as a hacksaw.

A rim 28 extends from around the edge of the bottom end of the hopper 14. The rim is in the form of a gutter and includes an aperture to drain rainwater. The main body 12 and in particular the rim 28 forms a roof over the tray 20, keeping the contents of the tray 20 dry. Keeping the tray 20 dry is important firstly to prevent clogging of caked-up damp food, and secondly to assist with controlling disease since parasites do not survive for long in dry conditions.

A perch 30 is provided, integrated with the tray 20 but spaced from the tray. The perch 30 is joined to the tray 20 by supports 32. The perch provides a place for the birds to stand while they feed. The position of the perch 30 in relation to the tray 20 and the rim 28 prevents most birds from standing in the tray 20, and limits contamination of the tray 20 by bird faeces. This helps keeps the bird feeder hygienic and limits spread of disease.

Figure 2:
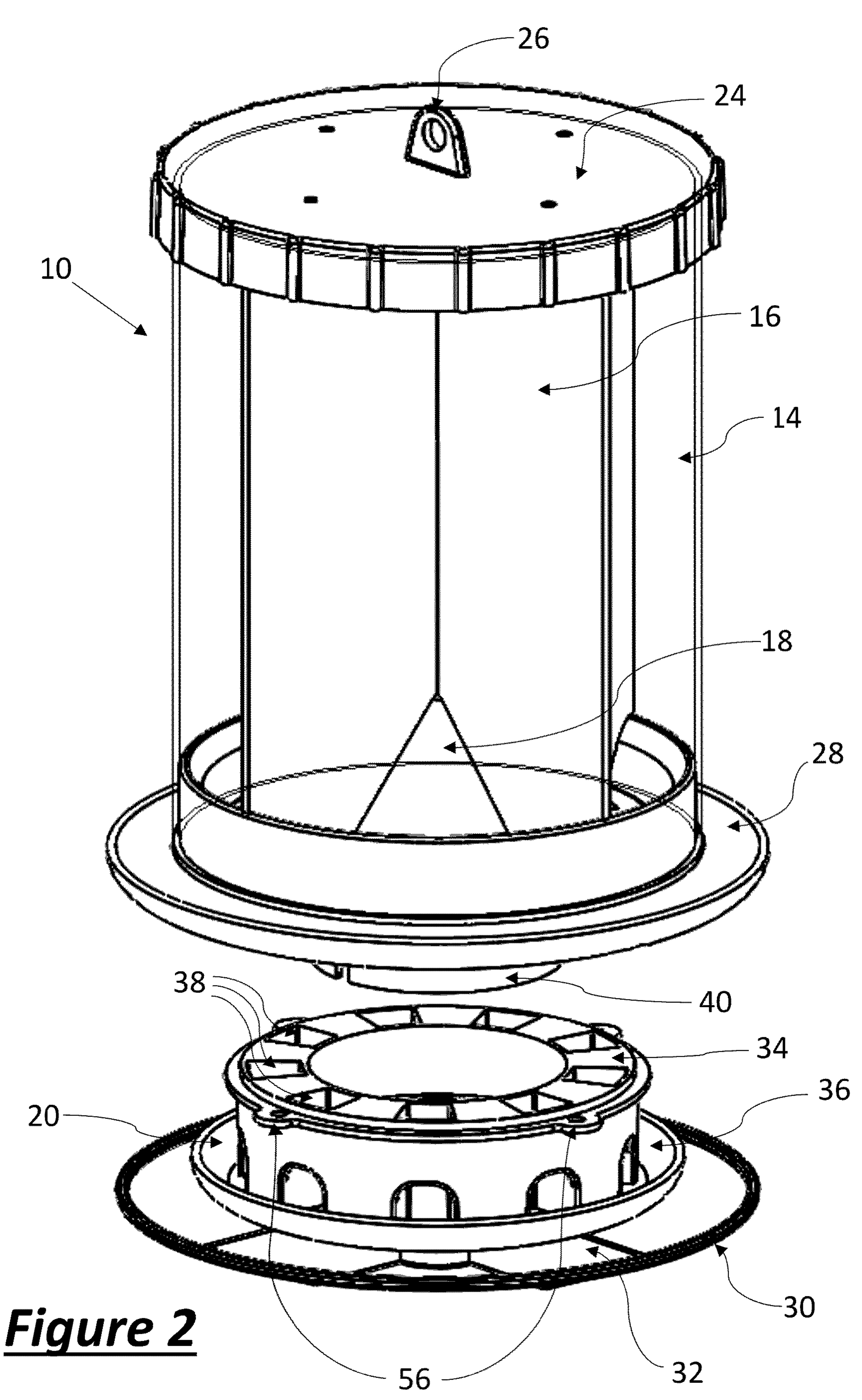
FIG. 2 is a perspective view of a bird feeder according to the invention, with the tray removed.

In FIG. 2 features of the tray 20 can be seen more readily. In this embodiment the tray 20 has no moving parts. It may be formed integrally in one piece or in a number of pieces, depending on the manufacturing techniques used. However for the purposes of its operation as part of the bird feeder 10 the tray 20 is a single part. The tray 20 includes a structure in the form of a cylindrical shell 34, which extends upwardly from a floor 36 of the tray 20. The cylindrical shell in this embodiment may have a wall of for example around 20 mm thick, and a plurality of channels 38 may be formed in the wall of the cylindrical shell for guiding food from the apertures (22, FIG. 1) in the bottom of the hopper 14, down through the wall of the cylindrical shell 34 and onto the floor 36 of the tray 20 where it may be eaten by a bird. The channels 38 have an entry opening on the top surface of the cylindrical shell 34, and an exit opening at the bottom of the curved surface of the cylindrical shell 34. The entry openings correspond with the positions of apertures (22, FIG. 1)

in the bottom of the hopper 14 so that food may pass out of the hopper 14, through the apertures 22, into the channels 38 and then onto the floor 36 of the tray, when the tray 20 is installed onto the hopper 14.

Also visible in FIG. 2 is a small part of a cylindrical shell protrusion 40 from the bottom of the main body 12. An outer diameter of the cylindrical shell protrusion 40 of the main body 12 is slightly smaller than the inner diameter of the cylindrical shell 34 of the tray, so that the cylindrical shell protrusion 40 of the main body 12 can fit just inside the cylindrical shell 34 of the tray 20.

Figure 3:
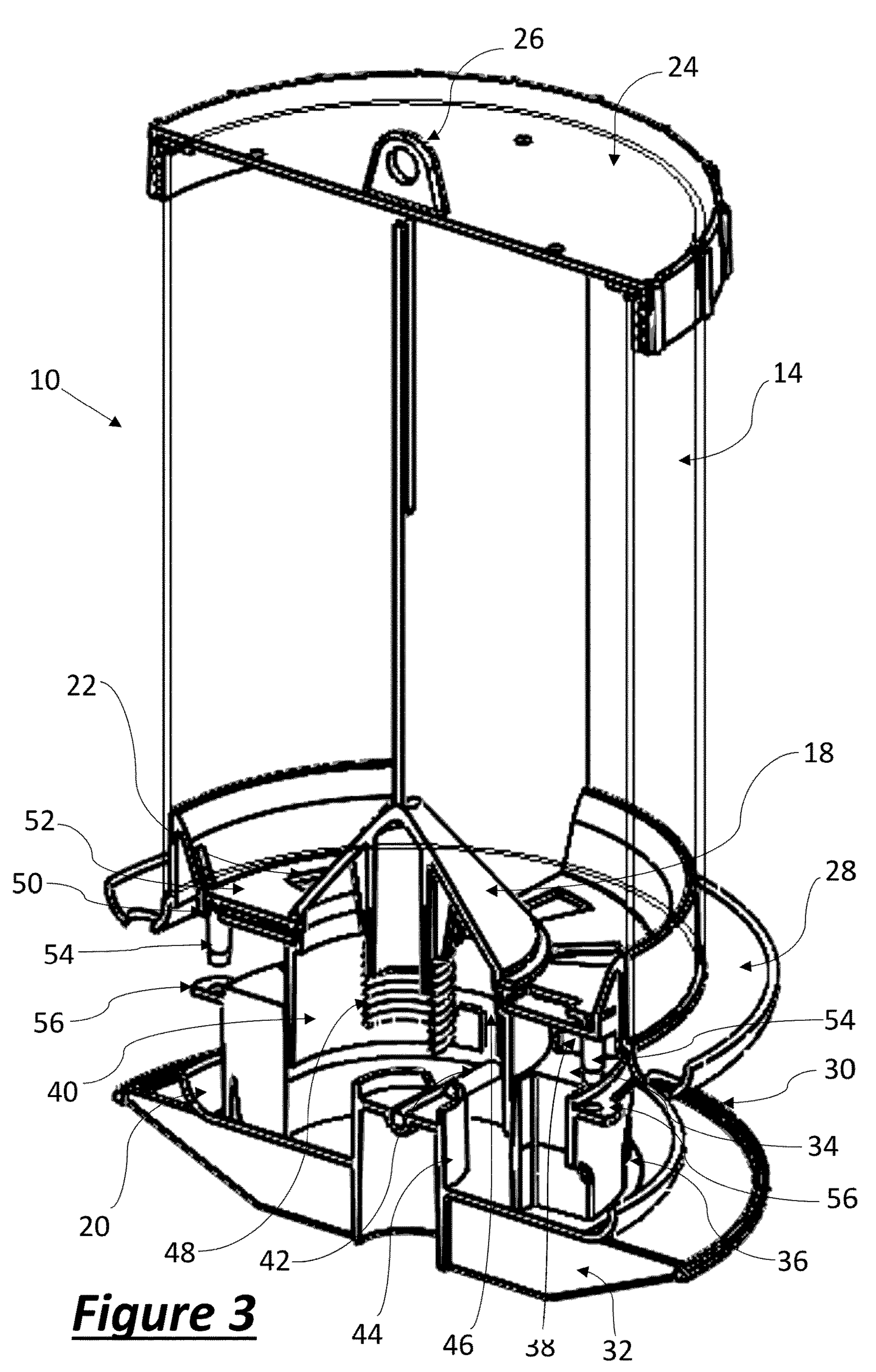
FIG. 3 is a cutaway view of the bird feeder of FIG. 2, showing the tray at a first stage in the process of being attached to the main body.
Figure 6:
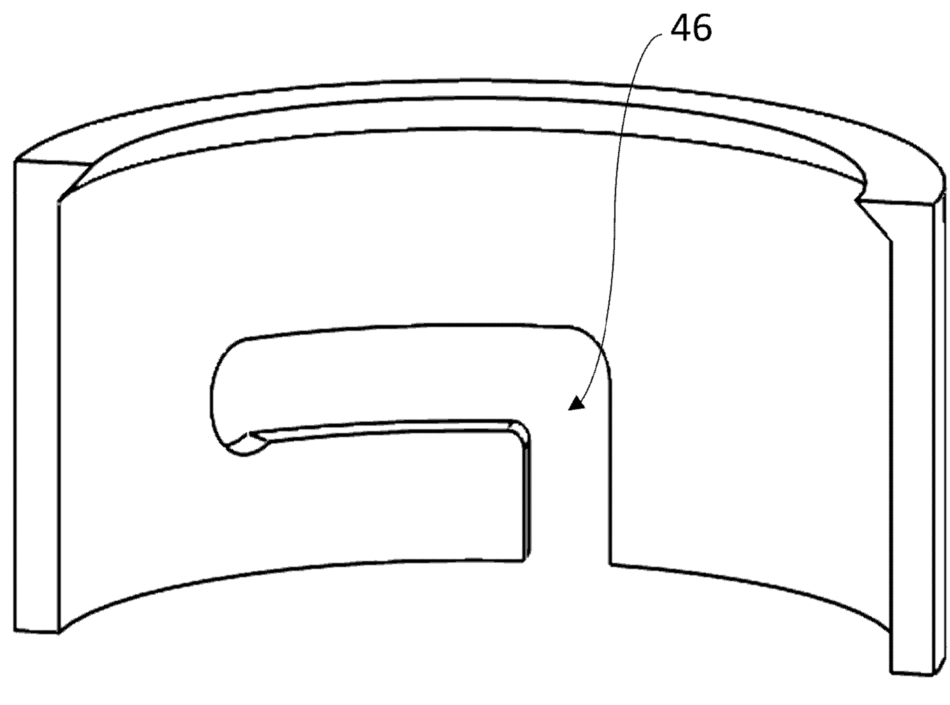
FIG. 6 is a detail of part of the main body of the bird feeder, showing the shape of the slot which forms part of the locking mechanism for locking the tray to the main body.

Referring now to FIG. 3, the tray 20 is in the process of being attached to the main body 12. In the cutaway view of FIG. 3, a pin 42 is visible, which is supported substantially horizontally between the inner wall of the cylindrical shell 34, and a central upstand 44. Preferably, the pin extends across the entire diameter of the circle defined by the inner wall of the cylindrical shell 34, i.e. the arrangement shown is mirrored in the part not shown in the cutaway view. The pin 42 corresponds in use with an upside-down-L-shaped slot 46 (shown more clearly in FIG. 6). The pin 42 and the slot 46 together form a bayonet-type connection for locking the tray 20 onto the main body 12.

A spring 48, in this case a coil spring, is held captive on the base of the main body and urges the tray 20 away from the main body in use.

The base of the hopper 14 is formed from two apertured plates. In this embodiment the fixed plate 50 is the lower plate and the movable plate 52 is the upper plate. The fixed lower plate 50 is formed integrally with a bottom part of the structure of the hopper 14. The movable upper plate 52 can rotate with respect to the fixed lower plate 50. Both plates include apertures 22. The plates 50, 52 can relatively rotate so that either the apertures 22 in each plate line up with each other, allowing food to pass from the hopper 14 to the tray 20 below, or the apertures 22 do not line up, blocking the apertures 22 so that food is retained in the hopper 14.

Pins 54 protrude from an underside of the upper movable plate 52, and through slots in the lower fixed plate 50. The pins correspond with apertures in a flange 56 extending from an outside wall of the cylindrical shell 34 of the tray 20. As the tray 20 is moved towards the main body 12, in the position determined by the pin 42 and slot 46, the pins 54 are inserted into the apertures in the flange 56.

Figure 4:
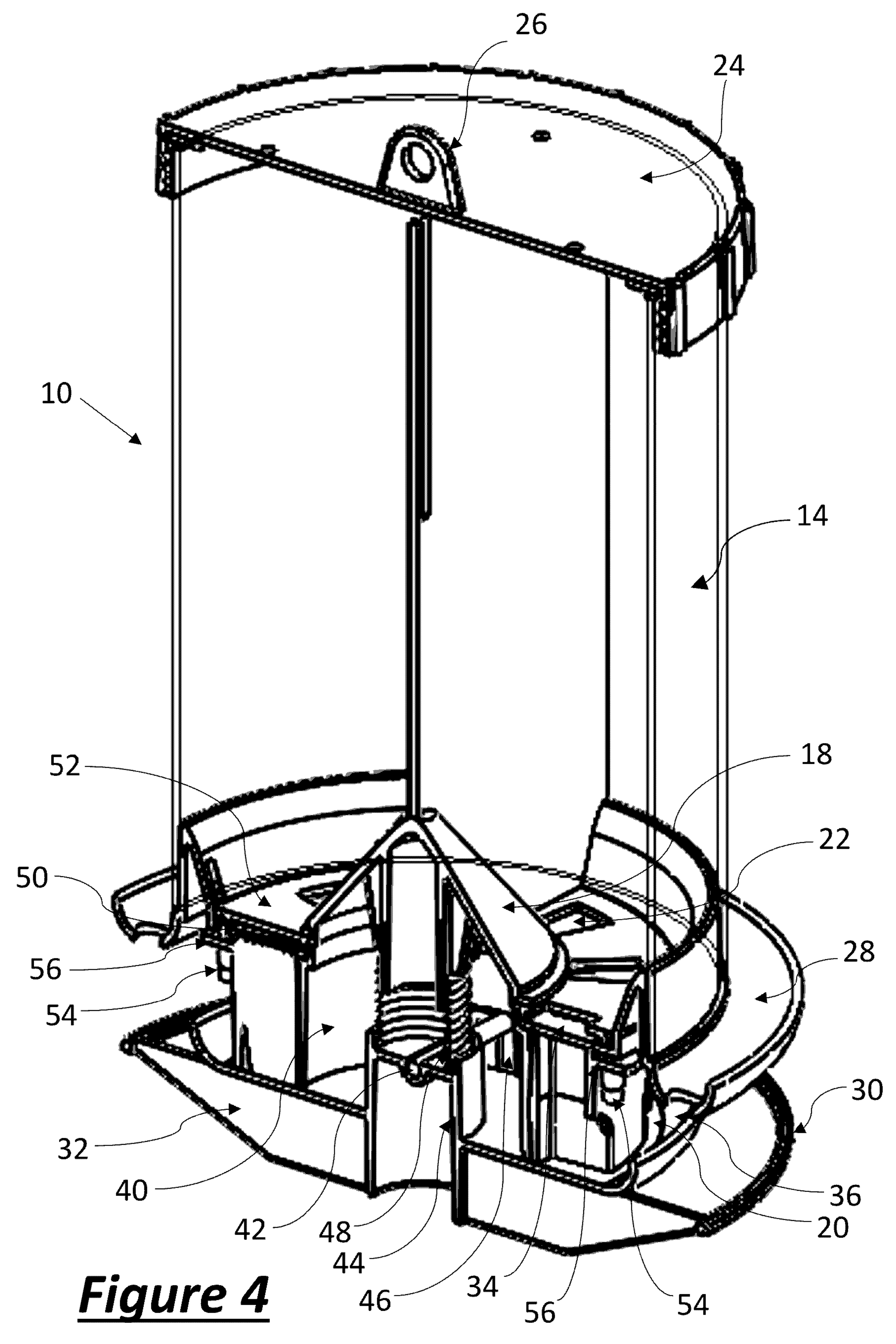
FIG. 4 is a cutaway view of the bird feeder of FIG. 2, showing the tray at a second stage in the process of being attached to the main body.

FIG. 4 shows the tray 20 once it has been pushed as far as it will go against the main body 12. The pins 54 are fully engaged in their respective apertures, and the pin 42 is on the corner of the upside-down-L-shaped slot 46. The spring 48 is compressed. Note that in this position, the apertures 22 in the upper and lower plates 52, 50 are not lined up, and so no food will fall from the hopper 14 into the tray 20.

Figure 5:
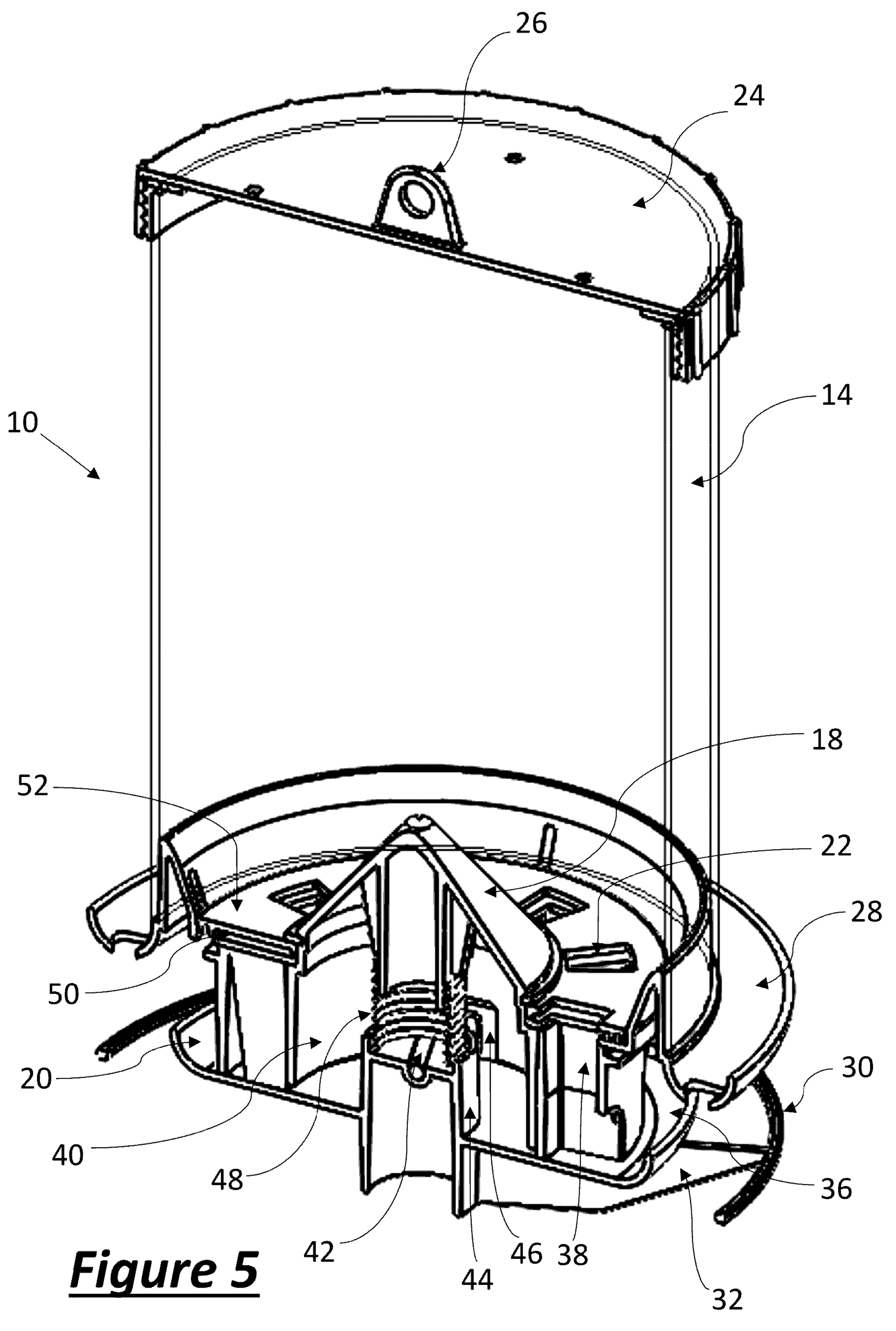
FIG. 5 is a cutaway view of the bird feeder of FIG. 2, showing the tray attached and locked to the main body.

FIG. 5 shows the tray 20 and main body 12 after the tray has been rotated with respect to the main body. As will be understood by reference to the diagram of the slot 46 in FIG. 6, once rotated the tray 20 and main body will move apart slightly, and the spring will act to lock the tray 20 and main body together and prevent accidental detachment. To unlock and detach the tray from the main body, it is simply necessary to push the tray 20 and main body 12 together, and then rotate.

When the tray 20 is rotated with respect to the main body 12, from the position shown in FIG. 4 to the position shown in FIG. 5, the pin 42 moves horizontally along the upside-down-L-shaped slot 46, and at the same time the pins 54 of the upper movable plate 52 are pushed around since they are engaged in the apertures in flanges 56. The tray 20 rotates with respect to the main body 12, but the upper movable plate 52 is stationary with respect to the tray, and so rotates also with respect to the rest of the main body 12. The tray 20 rotates to an extent defined by the shape of the upside-down-L-shaped slot (46, FIG. 6), and the apertures 22 in the upper and lower plates 50, 52 line up, allowing food to drop from the hopper 14 into the tray 20, to feed the birds.

In the embodiment of FIGS. 1 to 6, the tray 20 is either locked and retained to the main body 12, in which position the apertures 22 line up, allowing food to drop from the hopper 14 into the tray 20, or the tray 20 is detached from the main body 12, in which position the apertures 22 do not line up, preventing passage of food out of the hopper 14. However, it is found to be advantageous to allow the tray to remain attached to the main body with the apertures 22 not lined up (i.e. the apertures closed). This allows the tray to remain attached for a few hours prior to changing the tray, so that birds can eat all of the food remaining in the tray, reducing waste.

Figure 7:
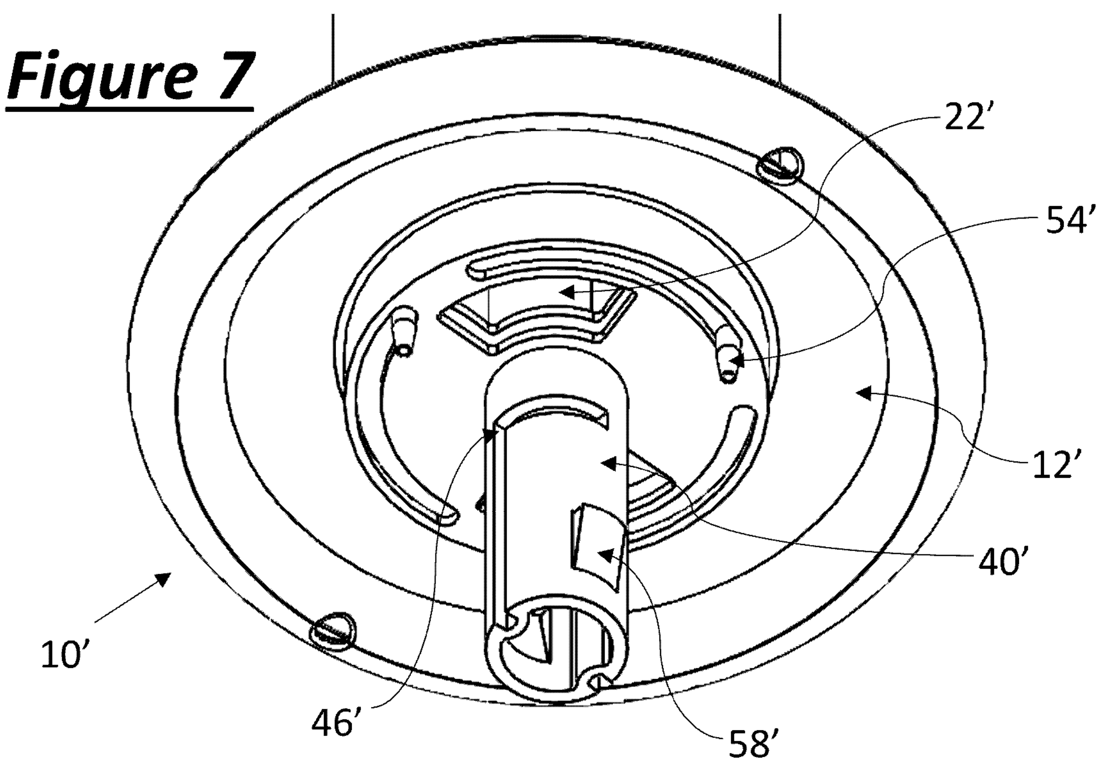
FIG. 7 is a perspective view from underneath a main body of a second embodiment of a bird feeder according to the invention.
Figure 8:
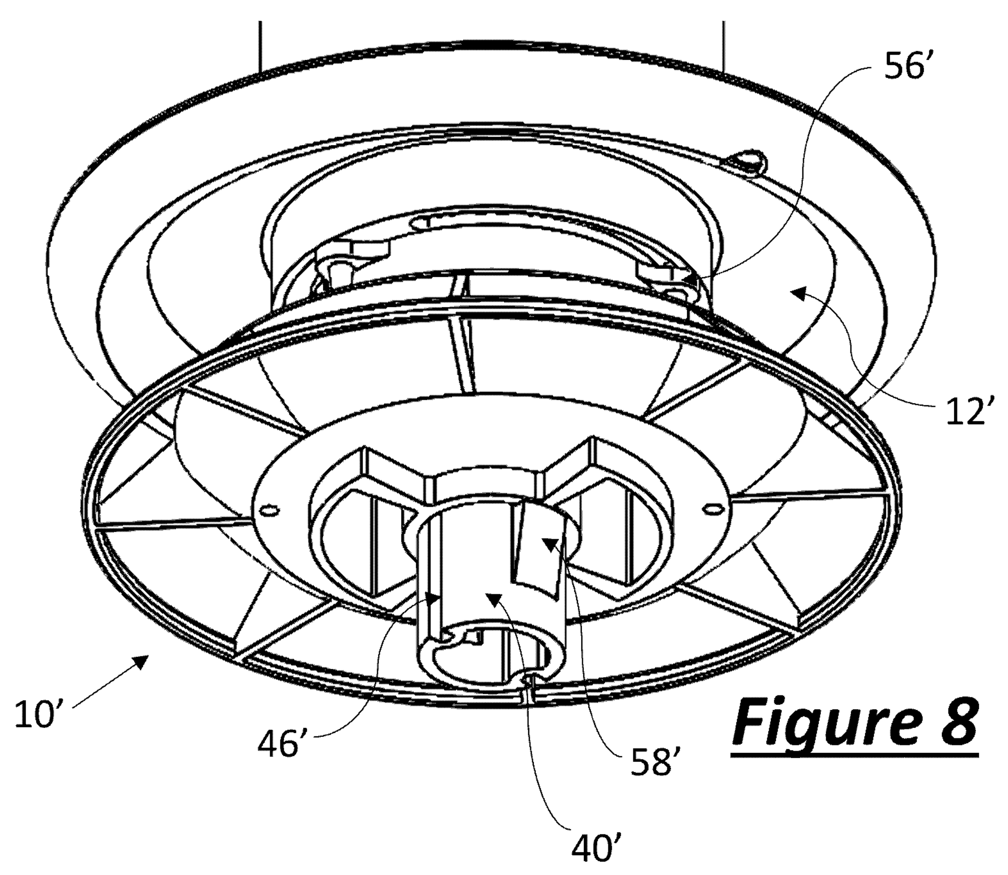
FIG. 8 is a perspective view from underneath of the bird feeder of FIG. 7, with a feeding tray attached.
Figure 9:
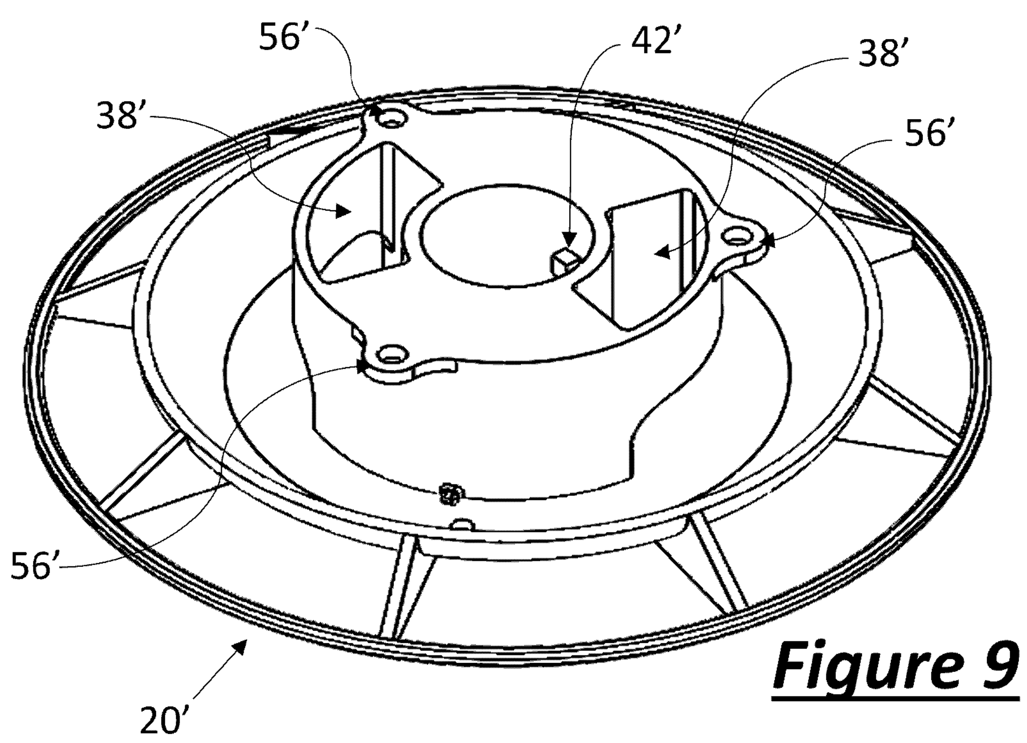
FIG. 9 is a perspective view from above of the feeding tray of FIG. 8.

A second embodiment illustrated at FIGS. 7 to 9 incorporates a secondary retaining means, so that the tray can be unlocked from the main body, closing the apertures, while leaving the tray attached to the main body until such time as it is removed in a separate step.

Referring to FIG. 7, a cylindrical shell protrusion 40' extends from the base of the main body 12' of the second embodiment bird feeder 10'. An upside-down-"L"-shaped slot 46' is provided in the cylindrical shell protrusion 40', like the first embodiment. However, in this case, the "L"-shaped slot is simply formed of two straight sides at right-angles. There is no short vertical slot section extending at right-angles from the end of the short arm of the "L", as in the first embodiment. Therefore, to lock the tray (20') onto the body 12' it simply needs to be pushed up and rotated. To unlock the tray (20') from the body 12' the tray just has to be rotated—no pushing upwards against a spring is required and indeed no spring is provided.

Like the first embodiment, pins 54' control relative sliding of apertures 22' to open or close a path for food to flow out of a hopper and into the tray 20'. The pins 54' correspond with apertures in flanges (56', FIG. 8, FIG. 9) of the tray 20'.

To retain the tray (20') onto the body 12', irrespective of whether the parts are "locked" or "unlocked" by rotation and sliding of a pin (42', FIG. 9) in the "L"-shaped slot 46', retractable lugs 58' are provided. In FIG. 7 one retractable lug 58' is clearly visible but in this embodiment another retractable lug 58' is provided on the other side of the cylindrical shell protrusion 40'. The lugs 58' either extend out from the cylindrical shell protrusion 40', as shown in FIG. 7, or can be retracted into the cylindrical shell protrusion. A spring biases the lugs 58' into the extended position, but this spring force can be easily overcome by pushing with a finger, to temporarily retract the lugs 58' into the cylindrical shell protrusion 40'.

The lugs 58' extend or retract by pivoting about a lower edge of the lug 58'. In this way the pivot when extended forms a wedge shape, the thin end of the wedge being at the pivot, on the lower edge of the lug 58'. When the tray (20') is slid upwards, over the cylindrical shell protrusion 40' to attach the tray (20') onto the main body, the lugs are thus forced inwards, into the retracted position, by the inner wall of the cylindrical shell (34') of the tray (20'). Once the tray (20') has been moved upwards far enough to pass over the lugs 58', the lugs 58' spring back outwardly, and the tray (20') is retained to the main body 12' by the lugs. The tray (20') in effect sits on top of the thick end of the wedge-shaped lugs 58'—see FIG. 8.

To remove the tray 20', when unlocked, the wedge-shaped lugs 58' just need to be pushed with fingers to retract them into the cylindrical shell protrusion 40'. The tray 20' can then be slid downwards, over the lugs, and detached from the main body 12'.

FIG. 9 shows the tray 20' in more detail. The tray has only two channels 38', each of which is wider than the channels 38 in the first embodiment. Wider channels avoid the channels clogging up with feed, especially if it becomes damp.

Figure 10:
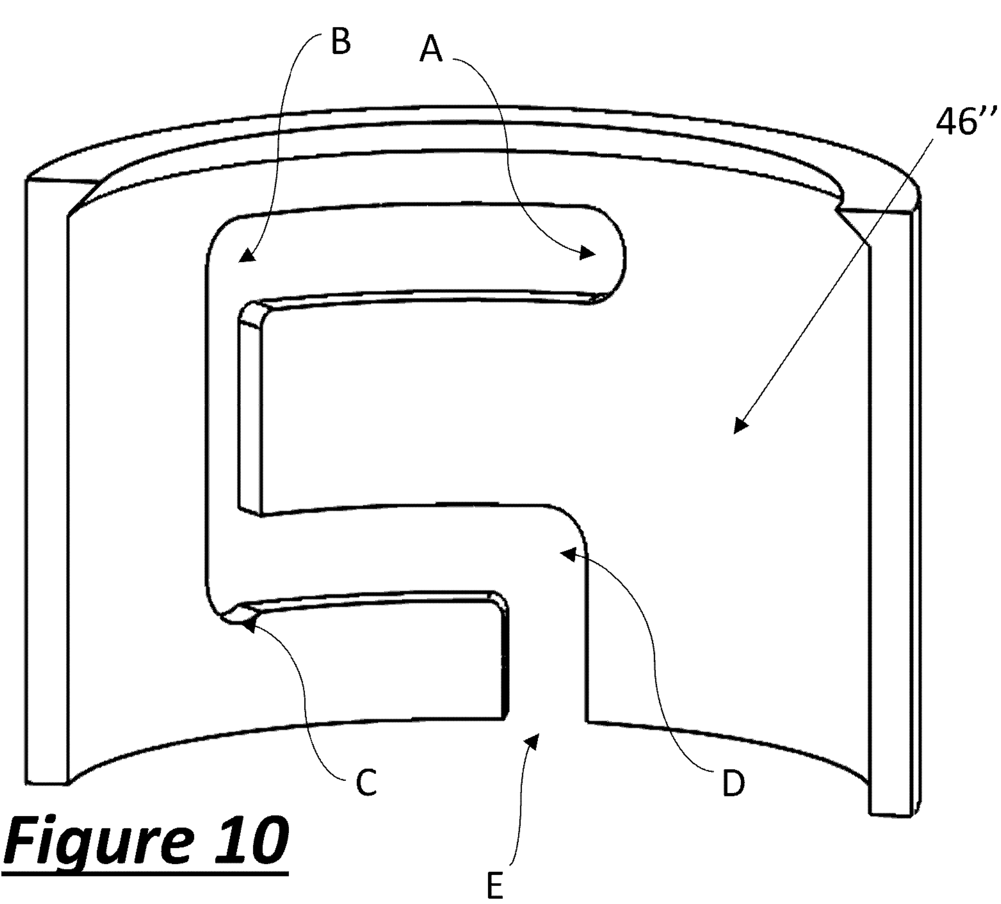
FIG. 10 is a detail of part of the main body of an alternative embodiment of a bird feeder, showing a slot arrangement which forms part of the locking mechanism as well as providing a secondary retaining means.

FIG. 10 shows a shaped slot 46" which may be used in other embodiments. One advantage of the shaped slot 46" is that it allows the slot 46" and a corresponding pin (like pin 42, 42') to provide both the locking means, and secondary retaining means for retaining a tray to the a main body when in the 'unlocked' position with apertures closed.

With the pin at the position indicated at A in FIG. 10, the tray is locked to the main body and the apertures are open. To unlock the tray from the aperture, the tray can be rotated to move the pin to position B. The rotation will cause the apertures to close, by means of pins (like pins 54') engaging with the tray (like flanges 46').

The tray can then drop down, and the pin can sit in the position indicated at C in FIG. 10. In this position, the tray is prevented from dropping further and the tray remains retained on the main body of the feeder.

Note that the vertical distance between B and C is longer than the length of the pins like pins 54'.

The tray can be left in this position, retained on the main body but with the apertures closed so that food will no longer fall into the tray, for around a few hours or a day, while birds eat any food left in the tray.

The tray can then be moved upwards slightly and then rotated back in the other direction, so that the pin is at position D and then finally position E where the tray is no longer engaged with the main body.

It may even be preferable to omit the short vertical part of the slot which extends below the lower of the horizontal slots, so that the tray does not need to be lifted to move it from the "unlocked but retained" position to detach the tray.

The slot arrangement in FIG. 10 may be described as having two parallel horizontal slots, the ends of the horizontal slots being joined together by a vertical slot, and a further vertical slot extending from the other end of the lower of the two horizontal slots, to a lower edge of the cylindrical shell protrusion of the main body.

Figure 13:
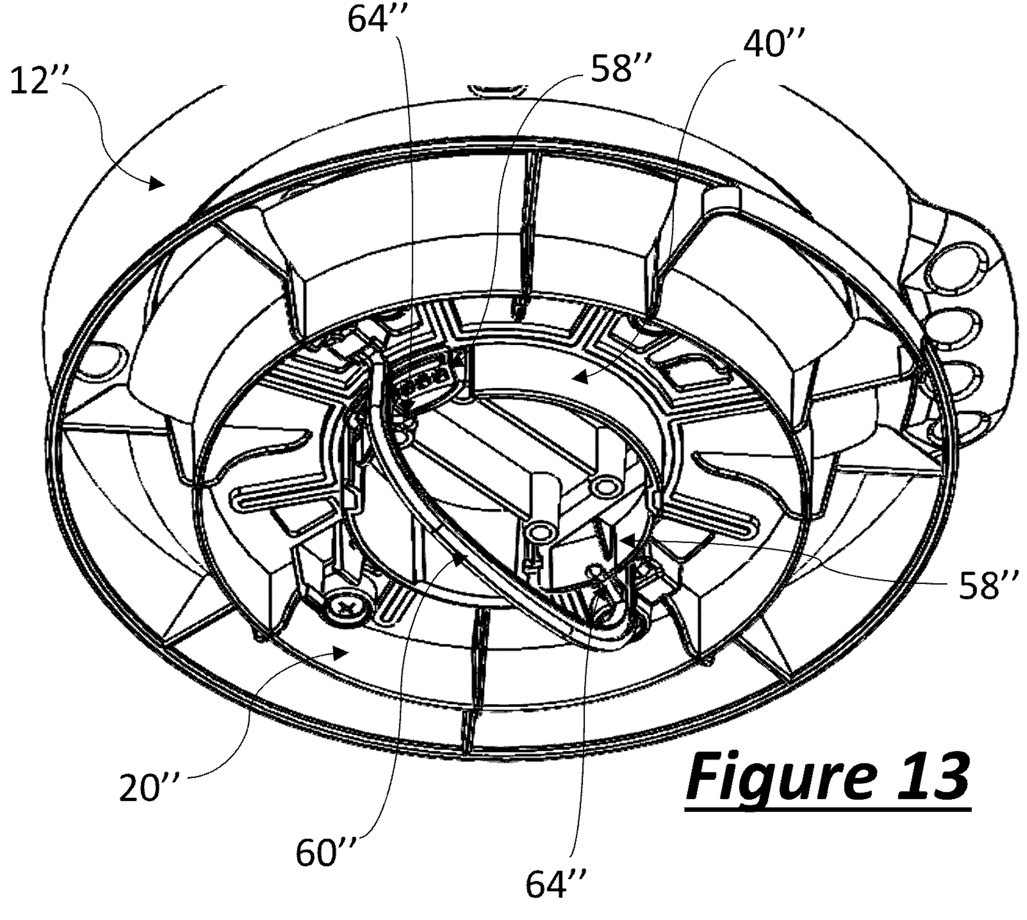
FIG. 13 is a perspective view of the tray of FIG. 12, in an unlocked position with a handle pivoted downwardly for releasing the tray.

A further embodiment of a bird feeder is shown in FIGS. 11 to 13. The embodiment of FIGS. 11 to 13 is in most respects similar to the embodiment of FIGS. 7 to 9. The underside is shown in the drawings, and it is apparent that retractable lugs 58" are provided on cylindrical shell 40" to retain the tray 20" to the body 12". On the underside of the tray 20", a pivoting handle 60" is provided. The pivoting handle is roughly U-shaped, and connected to the underside of the tray 20" by pivots at either end of the 'U'. A resilient retaining formation 62" is provided on the underside of the tray to retain the handle 60" in a position where it is folded against the tray, i.e. with 'U' substantially against an undersurface of the tray along substantially the entire length of the 'U' curve.

In FIG. 11 the tray is in the locked position, where food can flow from the body 12" into the tray 20". As in the other embodiments, the tray 20" is rotated with respect to the body 12" in order to close apertures and prevent flow of food, and in this position the pivots at the ends of the U-shaped handle 60" line up with the positions of the lugs 58" on the cylindrical shell 40". The tray 20" is shown in this position in FIG. 12. From this position the handle 62" can be released from the resilient retainer 64" and pivoted away from the bottom of the tray (pivoted downwardly in use), and it will be seen that inwardly-facing protrusions 64", provided facing each other on opposing arms of the 'U', interact with and push together the lugs 58". This has the effect of releasing the tray 20" from the body 12".

Providing a handle in this way allows for the tray 20" to be easily removed, with one hand if necessary. Bearing in mind that the feeder may be hanging from a rope or chain, the other hand may be used to steady the body of the feeder.

All embodiments of the bird feeder, by providing a detachable tray section which, when unlocked, automatically seals the hopper and prevents food from falling out, allows for a very easy cleaning process which wastes minimal food. If two trays are provided, then one tray can be in use while the other tray is being cleaned. Effective cleaning or disinfecting processes may be devised which require little manual labour. For example, the tray which is out of use could simply be left to soak in a bucket of disinfectant for a few days, while the other tray is in use. This should be more than adequate to kill *Trichomonas*. By alternating the trays in this way, good hygiene is ensured to limit the spread of disease, with minimum manual effort.

The embodiments described above are provided by way of example only, and various changes and modifications will be apparent to persons skilled in the art without departing from the scope of the present invention as defined by the appended claims.

What is claimed is:

1. A bird feeder comprising:

a main body including a bulk hopper for storing food, a feeding tray removably attached to a bottom end of the main body, the tray including a retaining lip for retaining food within the tray and a vertical wall being provided inward of an outer periphery of the tray, and a perch spaced away from the tray, wherein an opening is provided in the bottom end of the main body to allow stored food to pass from the bulk hopper into the tray allowing birds to feed from the tray when the tray is attached to the bottom end of the main body, and a closure is provided for closing the opening and retaining food in the bulk hopper, and wherein a locking mechanism is provided for locking the feeding tray and main body together, preventing removal of the feeding tray from the main body when the locking mechanism is engaged, and wherein opening the closure causes engagement of the locking mechanism, and closing the closure causes disengagement of the locking mechanism, the feeding tray being detachable from the main body only when the closure is closed, and wherein a secondary retainer is provided for retaining the feeding tray to the main body when the locking mechanism is disengaged.

2. The bird feeder as claimed in claim 1, further comprising a second feeding tray, for attaching to the main body of the bird feeder while the first feeding tray is detached for cleaning.

3. The bird feeder as claimed in claim 1, wherein the locking mechanism is operated by rotating the tray with respect to the main body.

4. The bird feeder as claimed in claim 1, wherein the main body includes a pair of relatively movable plates, each having apertures, the apertures in one position lining up to open the opening, and in another position the apertures being disaligned to close the opening.

5. The bird feeder as claimed in claim 4, wherein a pin is provided to link the rotating plate of the main body to the tray, for controlling alignment or dealignment of the apertures by rotating the tray with respect to the main body.

6. The bird feeder as claimed in claim 1, wherein the main body forms a roof over the tray.

7. The bird feeder as claimed in claim 1, wherein the secondary retainer is provided as one or more retractable lug(s), the retractable lug(s) being spring-loaded into an outwardly extending position.

8. The bird feeder as claimed in claim 7, wherein a pivoting handle is provided on the tray, the pivoting handle being movable from an out-of-use position substantially lying against the underside of the tray, and an in-use position in which part of the handle pushes against the retractable lug(s) to release the tray from the main body.

9. The bird feeder as claimed in claim 7, wherein two lugs are provided, the lugs facing substantially away from each other from either side of a part of the main body.

10. The bird feeder as claimed in claim 1, wherein the locking mechanism comprises a pin disposed for sliding in an L-shaped slot.

11. The bird feeder as claimed in claim 10, wherein the pin is provided as part of the tray and the L-shaped slot is provided as part of the main body of the feeder.

12. The method of limiting the spread of disease in a population of birds, the method comprising the steps of:

providing a bird feeder in accordance with claim 2, and providing food for birds in the feeder;

installing one of the two feeding trays onto the main body of the bird feeder;

treating the other of the two feeding trays to kill an agent of infection; and alternating the feeding trays at intervals.

13. The method as claimed in claim 12, wherein alternating the feeding trays includes the steps of:

closing the closure to prevent food from passing from the bulk hopper to the tray;

leaving the tray attached to the main body for a period of time;

removing the tray from the main body, attaching a replacement tray, and opening the closure to allow food to pass from the bulk hopper to the replacement tray.

14. The method of limiting the spread of disease as claimed in claim 12, wherein the disease is trichomonosis.

15. The method of limiting the spread of disease as claimed in claim 12, wherein treating the feeding tray comprises soaking the feeding tray in a disinfectant solution.

16. The method of limiting the spread of disease as claimed in claim 12, wherein treating the feeding tray comprises drying the feeding tray.

* * * * *